(12) United States Patent
Renko et al.

(10) Patent No.: US 9,049,688 B2
(45) Date of Patent: Jun. 2, 2015

(54) SELECTIVE AUTO-ACCEPT OF FULL DUPLEX PUSH TO TALK CALL

(71) Applicant: Google Technology Holdings LLC, Mountain View, CA (US)

(72) Inventors: Mitchell E. Renko, Coral Springs, FL (US); David R. Heeschen, Coral Springs, FL (US); Jean Khawand, Miami, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 179 days.

(21) Appl. No.: 13/758,297

(22) Filed: Feb. 4, 2013

(65) Prior Publication Data

US 2014/0221034 A1 Aug. 7, 2014

(51) Int. Cl.
*H04B 7/00* (2006.01)
*H04W 72/08* (2009.01)
*H04W 76/00* (2009.01)

(52) U.S. Cl.
CPC .................................. *H04W 76/005* (2013.01)

(58) Field of Classification Search
CPC ........................... H04W 76/00; H04W 76/068
USPC ........ 455/518, 519, 517, 520, 509, 67.11, 68, 455/41.2, 452.1, 415, 416; 370/329, 352
See application file for complete search history.

(56) References Cited

U.S. PATENT DOCUMENTS

| 7,280,502 | B2 * | 10/2007 | Allen et al. | 370/329 |
| 2008/0063169 | A1 * | 3/2008 | Wang et al. | 379/201.01 |
| 2008/0285543 | A1 * | 11/2008 | Qiu et al. | 370/352 |
| 2012/0056972 | A1 * | 3/2012 | Benedeki et al. | 348/14.03 |

OTHER PUBLICATIONS

OMA Open Mobile Alliance, PoC User Plane, Approved Version 1.0.2-05 Sep. 2007, OMA-TS-PoC_UserPlane-V1_0_2-20070905-A, all pages.

* cited by examiner

*Primary Examiner* — John J Lee
(74) *Attorney, Agent, or Firm* — Faegre Baker Daniels LLP

(57) ABSTRACT

A device establishes a first communication session with an endpoint and is configured to perform the first session via one of two different call configurations. In response to unplanned termination of the first session, the device identifies a specific call terminating condition and determines when the call terminating condition is within a first subset of call terminating conditions. Then, in response, the device: creates a record of the first session, including information identifying the established call configuration; and activates a timer associated with the record. The device then autonomously accepts a request to establish a second communication session from an endpoint and implements the same call configuration for the second session, in response to the request (a) being received before expiration of the timer and (b) establishing the second session between the communication device and the same endpoint. With a Push-to-Talk call, the established call configuration is full duplex mode.

20 Claims, 7 Drawing Sheets

SELECTIVE AUTO-ACCEPT OF FULL DUPLEX PUSH TO TALK CALL

BACKGROUND

1. Technical Field

The present invention generally relates to Push-to-Talk (PTT) communication and in particular to a method, a system, and a device that enables seamless reconnection and configuration of dropped PTT calls.

2. Description of the Related Art

Push-to-Talk calls have become an acceptable method of communication between an originating user terminal and one or more end user terminals or user equipment (UE). With the wide acceptance of cellular communication and the proliferation of cellular UEs, PTT over cellular (PoC) has also become a popular method of communication amongst users having cellular-based UEs, such as mobile phones. These cellular-based UEs, also referred to as PoC terminals, run a PoC client that enables all of the functionality available with a legacy PTT device. For simplicity, the following description shall be made with specific reference to PoC, however, the described features and limitations are also applicable to PTT.

During a PoC call, the PoC client may provide the user(s) with the option of selecting whether to conduct the call using a half-duplex mode or a full-duplex mode. With a half-duplex mode, only one participant can speak at a time by depressing the talk button on that participant's user's terminal, and all sound originating at the other participant's end of the call is blocked while the first participant has the talk button depressed. With a full duplex mode, however, both participants are able to speak simultaneously and each participant can hear the other participant's speech as well as any surrounding background noise at the other participant's location. Some conventional PoC calls default to a half-duplex mode, and the participants must manually select the options to change the call to a full-duplex mode configuration.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

Figure 1:
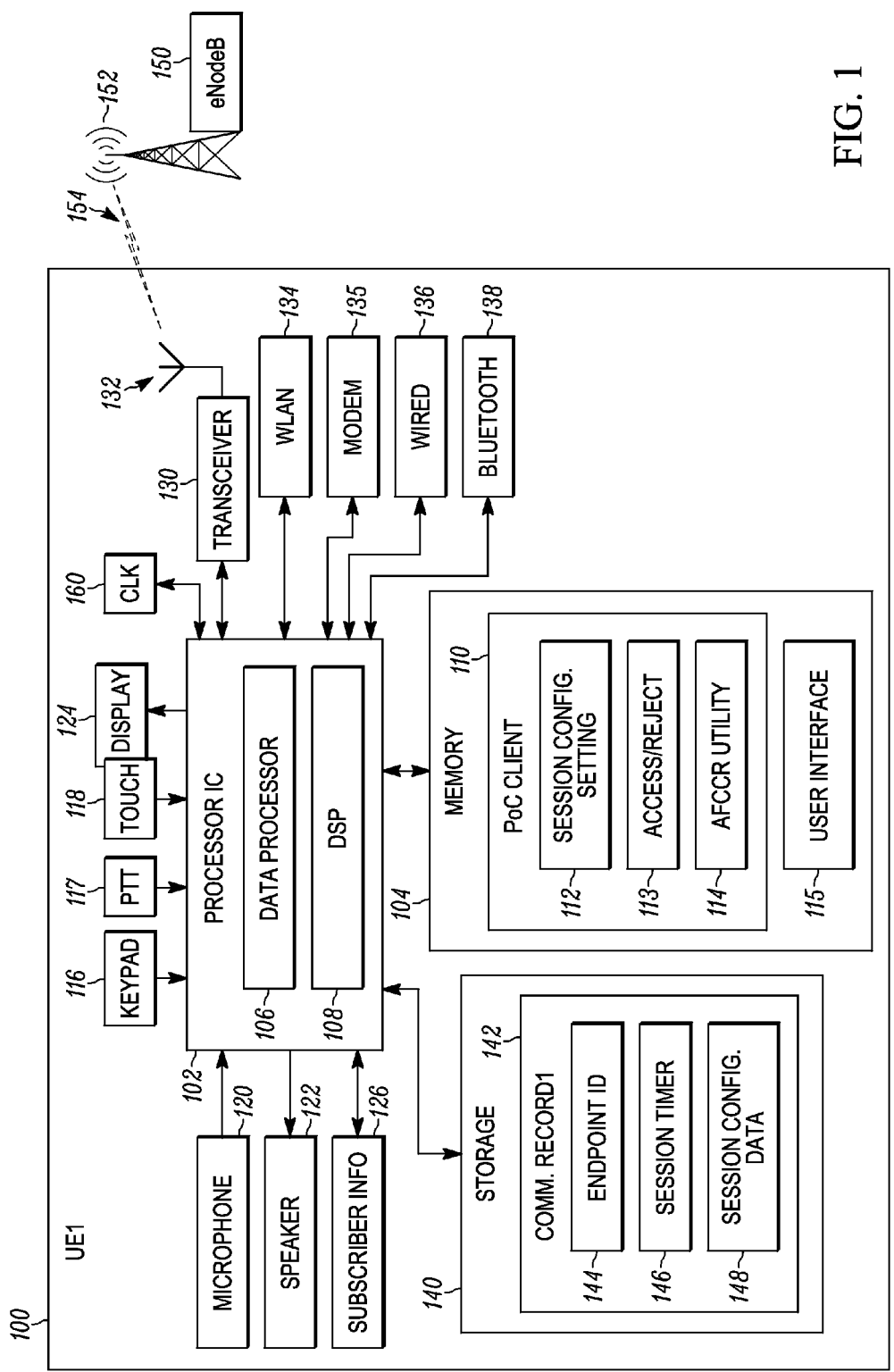
FIG. 1 provides a block diagram representation of an example Push-to-Talk (PTT) over cellular (PoC) user equipment (UE) or PoC terminal configured with various functional components that enable one or more of the described features of the disclosure, according to one embodiment.

Occasionally, an ongoing PoC call terminates due to one of a plurality of fault conditions that can occur at the network or at the PoC terminal level. When these terminations occur while the PoC call is established with full-duplex mode, a reconnection of the two terminals requires the full handshake mechanism between both PoC terminals, and such reconnection is handled as a standard initial connection, with the default half-duplex mode enabled. The re-connected PoC call participants must then configure their PoC clients to activate the full duplex mode if full-duplex mode communication is desired for the newly established PTT call.

The illustrative embodiments provide a method and communication device that enables seamless reconnection of full-duplex mode communication between Push-to-Talk (PTT) terminals and/or PTT over cellular (PoC) terminals. According to one aspect, a communication device establishes a first communication session with a second device and is configured to perform the first communication session via a first of two different call configurations. In response to unplanned termination of the first communication session, the device identifies a specific call terminating condition and determines when the call terminating condition is one of a first subset of call terminating conditions. Then, in response, the device: creates a record of the first communication session, including information identifying the first call configuration; and associates a timer with the record and activates the timer. The device then (1) autonomously accepts a request to establish a second communication session and (2) establishes the second communication session as a reconnection of the first communication session by implementing the first call configuration for the second communication session, in response to the request (a) being received before expiration of the timer and (b) the request establishing the second communication session between the communication device and the same second device. With a PTT or PoC call, the first call configuration is full duplex mode, which requires manual selection by a user of the PoC terminal during normal call connections.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/ or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

For simplicity in describing the disclosure, references will be made hereinafter to PoC calls and associated PoC server, PoC terminals, PoC user equipment (UE), and PoC clients. However, it is appreciated that the concepts described herein can be applied to a standard PTT communication network and associated PTT terminals. Thus, no limitations are intended with respect to the overall reach of the disclosure based on the specific use of PoC to describe the embodiments herein.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

With reference now to the figures, and beginning with FIG. 1, there is depicted a block diagram representation of an example PoC UE1 100 operating within and in communication with a wireless communication network, generally represented by a base station, evolution NodeB (eNodeB) 150, having base station antenna 152. As presented herein, the wireless communication network and PoC UE1 100 can both support multiple communication protocols and/or multiple radio access technologies that allow for simultaneous transmission and simultaneous reception of signals from/to PoC UE1 100. In particular, and as further illustrated by FIG. 2, the wireless communication network and PoC UE1 100 both support PTT communication and specifically PoC communication exchange.

PoC UE1 100 can be one of, and can be referred to as, a system, device, subscriber unit, subscriber station, a mobile station (MS), a mobile, a mobile device, a remote station, a remote terminal, an access terminal, a user terminal, a terminal, a communication device, a user agent, a user device, a cellular or mobile telephone, a smart phone, a satellite phone, a cordless telephone, a Session Initiation Protocol (SIP) phone, a wireless local loop (WLL) station, a personal digital assistant (PDA), a handheld device having wireless connection capability, a computing device, such as a desktop, laptop, tablet, or other processing devices connected to a wired or wireless modem. For consistency, all such representations are encompassed within the term PoC UE1 100 which is utilized herein to represent any device that supports and/or enables PTT communication.

PoC UE1 100 comprises processor integrated circuit (IC) 102 that is connected to memory 104 via a bus interface. Processor IC 102 can include one or more programmable microprocessors, such as data processor 106 and digital signal processor (DSP) 108. The processor IC 102 controls the communication and other functions and/or operations of the PoC UE1 100. These functions and/or operations can include, but are not limited to, application data processing and signal processing.

Memory 104 can include volatile memory and/or non-volatile memory. One or more applications can be stored within memory and executed by data processor 106 or DPS 108 on processor IC 102. According to the illustrative embodiment, memory 104 includes PoC Client 110 and user interface 115. PoC Client 110 represents the collection of application code, executable software utility, or program modules that enable PoC UE1 100 to perform and/or support the various functional features associated with a PoC user terminal. PoC Client 110 executes on data processor 106 and/or DPS 108 to configure PoC UE1 100 to support one end of a PoC communication or PoC call with another PoC UE (not shown). PoC Client 110 includes session configuration setting module 112, one or more of an access list or a reject list, collectively illustrated as access/reject data block 113, and Automatic Full-Duplex Call Configuration on Reconnection (AFCCR) utility 114. Those skilled in the art are familiar with the concept of an access list and a reject list within a PoC environment. AFCCR utility 114 provides a set of software-enabled functional modules that perform the various features described herein, according to one embodiment. In one more general implementation, AFCCR utility 114 is replaced with a generic auto-accept call resumption utility, which can include the functionality of AFCCR utility 114. The generic auto-accept call resumption utility automatically connects a second call that is received within a time period following a termination of a first call or communication session, using the prior configuration of the first call, where the prior configuration can include one or more opt-in features that are normally established by user action following initiation of a new call or communication session. User interface 115 is a firmware-enabled mechanism by which PoC Client 110 can receive input selections and provide output to a user interfacing with PoC UE1 100, such as prior to and/or during a PoC call. The associated functionality and/or usage of both software modules 110 and 115, and specifically AFCCR utility 114 will be described in greater detail within the descriptions which follow.

Also communicatively coupled to processor IC 102 and included within PoC UE1 100 are a set of input/output components. As shown, the input components can include keypad 116, PTT button 117, touchscreen 118 or touch interface, and microphone 120, while the output devices can include speaker 122, haptic interface (not shown), and display 124. In one or more embodiments, particularly where the UE is a smart phone, for example, touchscreen 118 and display 124 can be combined into a single touch display screen. Additionally, physical input devices such as keypad 116 and PTT button 117 can be provided as virtual touch interface components that are presented on display 124 rather than as separate physical components. PoC UE1 100 also comprises a subscriber information module (SIM) 126 on which an identification (ID) of the specific subscriber or user of the PoC UE1 100 can be stored. Subscriber information can also refer to the ID of the PoC UE1 100, in one embodiment.

In order to support external communication by PoC UE1 100 with other devices, PoC UE1 100 also comprises a transceiver 130 which is connected to an antenna 132. The combination of transceiver 130 and other functional components can, in one or more implementations, be referred to as a front-end module. Collectively, transceiver 130 and antenna 132 exchange communication signals 154 over an air interface with and within one or more communication networks, generally represented by eNodeB 150 and base station antenna 152. In addition to transceiver 130 and antenna 132, PoC UE1 100 is illustrated having other communication mechanisms for communicating with external devices. Among these communication mechanisms illustrated are wireless local are network connection module 134, Modulator-demodulator (MODEM) 135, wired connection module 136, and Bluetooth 138. These and other forms of communication mechanisms, including other near filed communication mechanism, for example, enable communication that can occur without a larger wireless communication network requiring the transceiver and antenna configuration.

Finally, also illustrated within PoC UE1 100 is local storage 140. Local storage 140 represents a non-volatile storage device, such as a NVRAM (non volatile random access memory) or other applicable technology of non-volatile storage. Local storage 140 can include the base program code for the PoC Client 110 and user interface 115 illustrated within memory 104, according to one embodiment. It is appreciated that the various types and amount of data and/or information that are stored in local storage 140 can vary. According to one aspect of the disclosure, local storage 140 includes PoC communication record 142. Only a single communication record 142 is presented within the figure; However, it is appreciated that multiple different records can be present within local storage 140 in situations where a one-to-many PoC call was established, with each record identifying each of the end point devices. Alternatively, multiple different records can also be present in situations where multiple different PoC calls have been terminated in sequence within the monitored timeframe following the creation of a first record for a first PoC call that was terminated. Within each communication record 142 are a target or destination endpoint ID 144, a session timer 146, and session configuration data 148. Each of these components has specific functional usage within the described embodiments, and the use of these components within the overall disclosure will be presented in detail within the following descriptions of the figures. Supporting the functionality of timer 146 is a system clock 160, which is also coupled to the processor and which provides the required timing features associated with tracking PoC call termination and subsequent reconnection events, as presented hereafter.

According to one aspect of the disclosure, certain functional features are provided by PoC Client 110 and specifically by execution of session configuration setting module 112 and AFCCR utility 114 on processors 106 and/or 108. Generally, these features enable the PoC UE1 100 and/or PoC Client 110 to accept a follow-on or subsequently-initiated full-duplex PTT call when the previous call was not terminated by one of the users on either end of the PTT call. Aspects of the disclosure involve establishing a pre-set list of termination conditions that are included in a small subset of allowable call termination reasons that can trigger a re-establishing of a next PTT call between the same two end terminals using the full-duplex mode. Another aspect of the disclosure provides a pre-specified maximum period of time during which the follow-on call must be initiated (e.g., received by the target device at one end of the previous PTT call). This second aspect mitigates concerns about an originator device attempting to eaves-drop on an unsuspecting target device. With the provided functionality, a UE participating in an approved full-duplex PTT call is provided a mechanism to automatically opt-in to certain subsequently received full-duplex PTT calls involving the same originating device without requiring a manual setup of the target device for that subsequent PTT call.

Figure 2:
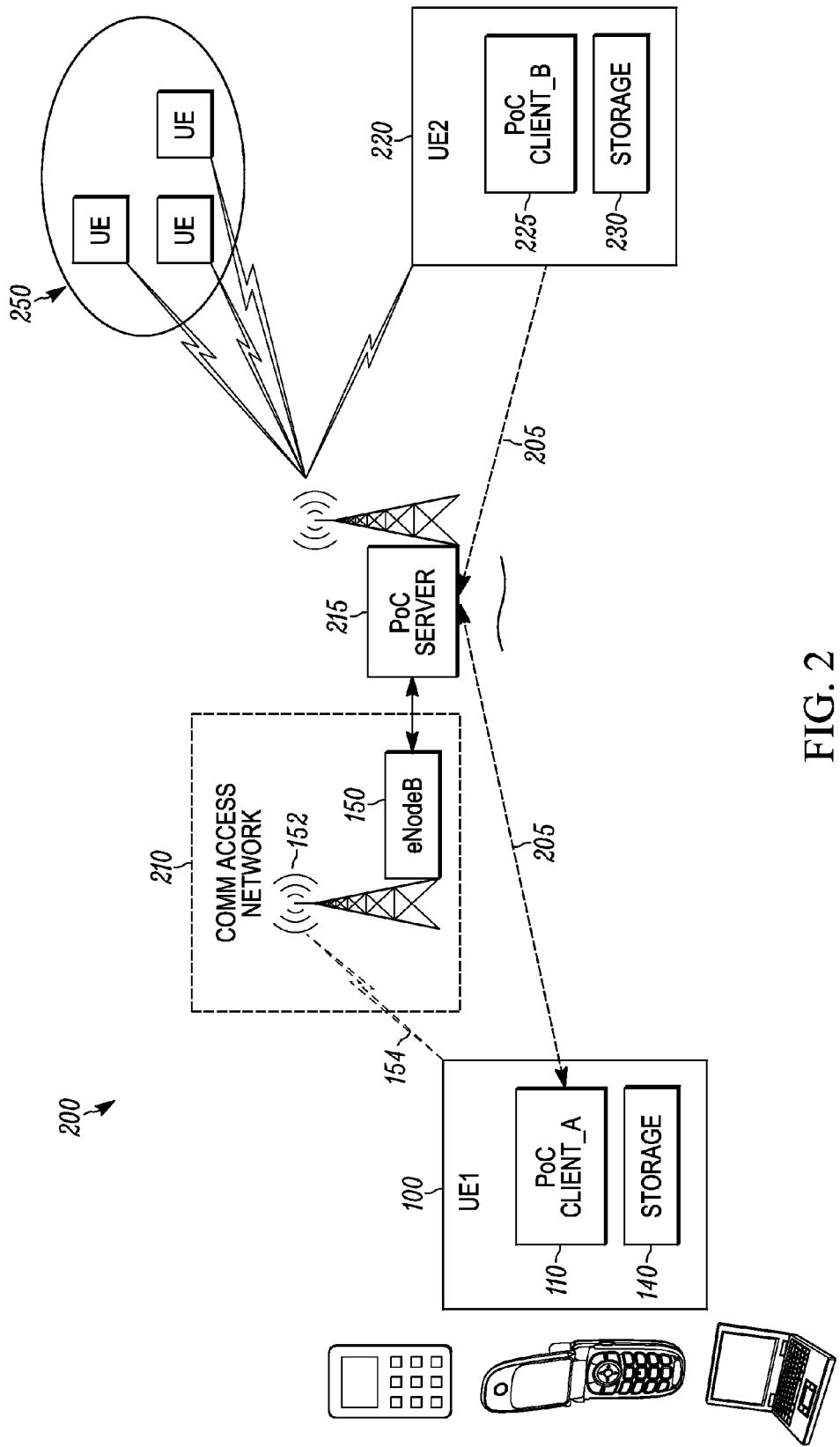
FIG. 2 illustrates an example PoC communication network including a PoC server within which various features of the disclosure can advantageously be implemented, according to one or more embodiments.

Referring now to FIG. 2, there is illustrated an example PoC communication network 200 within which the various features of the disclosure can be implemented, according to one or more embodiments. FIG. 2 and all of the following figures are described with reference to specific components within FIG. 1. Where a component is presented with a leading numeral of 1 that is not specifically identified within the figure being described, it is understood that the component reference relates back to the illustration of FIG. 1.

Within FIG. 2, PoC communication network 200 includes a first user equipment, PoC UE1 100, a second UE, UE2 220 and a group 250 of third UEs. The different UEs, i.e., UE1 100, UE2 220 and any one or all of UE3 group 250 can be communicatively connected to each other to support PoC communication via a network infrastructure. Within the infrastructure of PoC communication network 200 is a communication access network 210 and PoC Server 215. Communication access network 210 generally represents any one of the plurality of possible wireless communication networks, as introduced in the description of FIG. 1. Communication access network 210 includes a base station controller, represented as eNodeB 150, which is communicatively coupled to PoC Server 215. PoC Server 215 is in turn communicatively coupled to and/or capable of supporting PTT communication between any one of the UEs (100, 220, 250) that are registered with PoC Server 215 for PTT service.

The PTT functions of UE1 100 are provided by PoC Client_A 110 and data stored within storage 140. Similarly, the PTT functions of UE2 220 are provided by PoC Client_B 225 and data stored within storage_B 230. For purposes of the description, UE1 100 shall be referenced as the PTT target, while UE2 220 shall be referenced as the PTT originator. It is appreciated that the functionality and/or features described herein are fully applicable to these devices performing the exact opposite roles relative to the PTT communication. UE1 100 and UE2 220 can initiate and conduct a PTT call or PTT communication session 205 via PoC communication network 200. The established PTT communication session 205 is handled by PoC Server 215, which is configured with the required protocols and settings to support PTT communications via one-to-one or one-to-many connections. While the communication session 205 is generally indicated as involving wireless communication between the two UEs 100, 220, in one or more embodiments, UE1 100 and/or UE2 220 enables wired communication and the first communication session can be facilitated via a physical communication link between UE1 100 and the endpoint, UE2 220.

According to one embodiment, the described aspects of the disclosure are implemented with the following considerations:
(1) an originator device, e.g., UE2 220 or network, via PoC server 215, always transmits a call termination reason code to the target device, e.g., PoC UE1 100;
(2) if the previous full-duplex PTT call ended due to one or more pre-established trigger conditions, including but not limited to, the originator (220) or target (100) timing out based on a call duration timer exceeding the call duration limit or a voice inactivity timeout, a dropped call, or a network timeout, then a subsequent full-duplex PTT call from the originator/UE2 (220) originator or the same target (100) or vice-versa, within a specified period of time, will cause the target (100) to automatically accept the PTT call;
(3) if the subsequent full-duplex PTT call arrives beyond the specified period of time since the end of the previous PTT call, then the target (100) reverts to normal behavior, and the user of the target (100) will therefore need to accept the full-duplex PTT call in the usual or conventional manner of accepting a PTT call and configuring the PTT call for full-duplex mode, if desired;
(4) if the original full-duplex PTT call was terminated for any other reason than the pre-established trigger conditions, the subsequently received or placed full-duplex PTT call from the same originator (220) to the same target (100) or vice versa will require the user of the target (100) to accept the call in the usual or conventional manner of accepting a PTT call and configuring the PTT call for full-duplex mode, if desired; and
(5) if the subsequent full-duplex PTT call received by the target (100) is from a different originator device (e.g., one of UEs 250), then the target (100) reverts to normal behavior, and the user of the target (100) has to accept the call in the usual or conventional manner of accepting a PTT call and configuring the PTT call for full-duplex mode, if desired.

With the above presented PoC UE1 100 of FIG. 1 and the UE2 220 and PTT communication session 205 presented by FIG. 2, one aspect of the disclosure provides a device (UE1 100) comprising: at least one processor 106; and a storage device, i.e., memory 104, coupled to the at least one processor 102, 106 and having program code, i.e., PoC Client_A 110, that executes on the at least one processor 102, 106 and causes the device, UE1 100, to: establish a first communication session between a first client (110) and a second client (225); configure the first communication session to be performed via a first call configuration of at least two available call configurations; enable toggling of a configuration of the first communication session between the first call configuration and a second call configuration. The program code (110) further causes the device (100) to: in response to detecting a termination of the first communication session, identify from among a set of call terminating conditions a specific call terminating condition by which the first communication session terminates; and determine if the specific call terminating condition is a call terminating condition within a first subset of call terminating conditions. The program code (110) also enables the device to: in response to the specific call terminating condition being within the first subset of call terminating conditions, create a record (142) of the first communication session, including information indicating a call configuration that was active at the time of the call termination; associate a timer with the record (142) and activating the timer. Then, following creation of the record (142), the program code further causes the device to trigger at least the first client (110) to autonomously accept a request to establish a second communication session as a reconnection of the first communication session using the call configuration indicated by the information within the record (142), in response to the request (a) being received before expiration of the timer and (b) establishing the second communication session between the first client (100) and the second client (225).

According to one aspect, the program code (110) that causes the device (100) to create the record (142) of the first communication session further causes the device (100) to record first communication session information within the record (142), the information comprising an identification (144) of at least the second client, the call configuration (148), and a session timer value (146) from among one of (a) an expiration time of the timer and (b) an initial time at which the call termination occurred and a length of time for maintaining the record. In the illustrative examples, the second client ID is referred to as the endpoint ID 144 to generally indicate that the ID is that of the second client, i.e., not the PoC client performing the various processes on the local UE. It is appreciated that the PoC client that corresponds to the endpoint ID 144 can be either the originator or the target for one or both of the first communication session and the second subsequent communication. The program code (110) further comprises code that causes the device (100) to: store the record (142) within the storage (140); monitor the timer; and in response to the timer expiring, purge the record from the storage (140).

According to yet another aspect, the program code (110) causes the device (100) to: in response to receiving the request to establish the second communication session: check the storage (140) for a stored record associated with a previous communication involving both an originating client from which the request originated and an endpoint client to which the request is directed; and in response to not finding a stored record associated with a previous communication: request acceptance of the second communication session at the endpoint client; and in response to receiving the acceptance, establish the second communication session as a new communication session utilizing a default call configuration for new communication sessions.

In the various described embodiments, the first communication session and the second communication session are PTT communications and the first call configuration is a half-duplex mode and the second call configuration is a full-duplex mode. As presented above, the first client and the second client are PTT clients that handle the first communication session via one of PTT protocols and PoC protocols. These PTT protocols are enhanced to enable a communication terminated due to one of the first subset of call terminating conditions to be re-established autonomously on request from one of the first client and the second client within a pre-set time limit. The subset of call terminating conditions includes at least one of a voice inactivity timeout, a call duration timeout, a call drop condition, and a network timeout condition.

According to one embodiment, the half-duplex mode is a default call configuration and the program code further includes program code that causes the device to: in response to receiving an input to change the call configuration from the default call configuration, toggle the call configuration to the full-duplex mode and support the first communication session in full-duplex mode.

According to yet another aspect of the disclosure, one or more embodiments provide that the device (100) includes at least one output mechanism (display 124) that enables output of call-related output parameters. The program code (110) that causes the device (100) to autonomously accept the request to establish the second communication session further includes code that causes the device (100) to generate an output at the device (100) indicating that the second communication session is being performed via the second call configuration. This generation of the output at device (100) occurs in response to the call configuration data (148) within the record (142) being the second call configuration.

Figure 3:
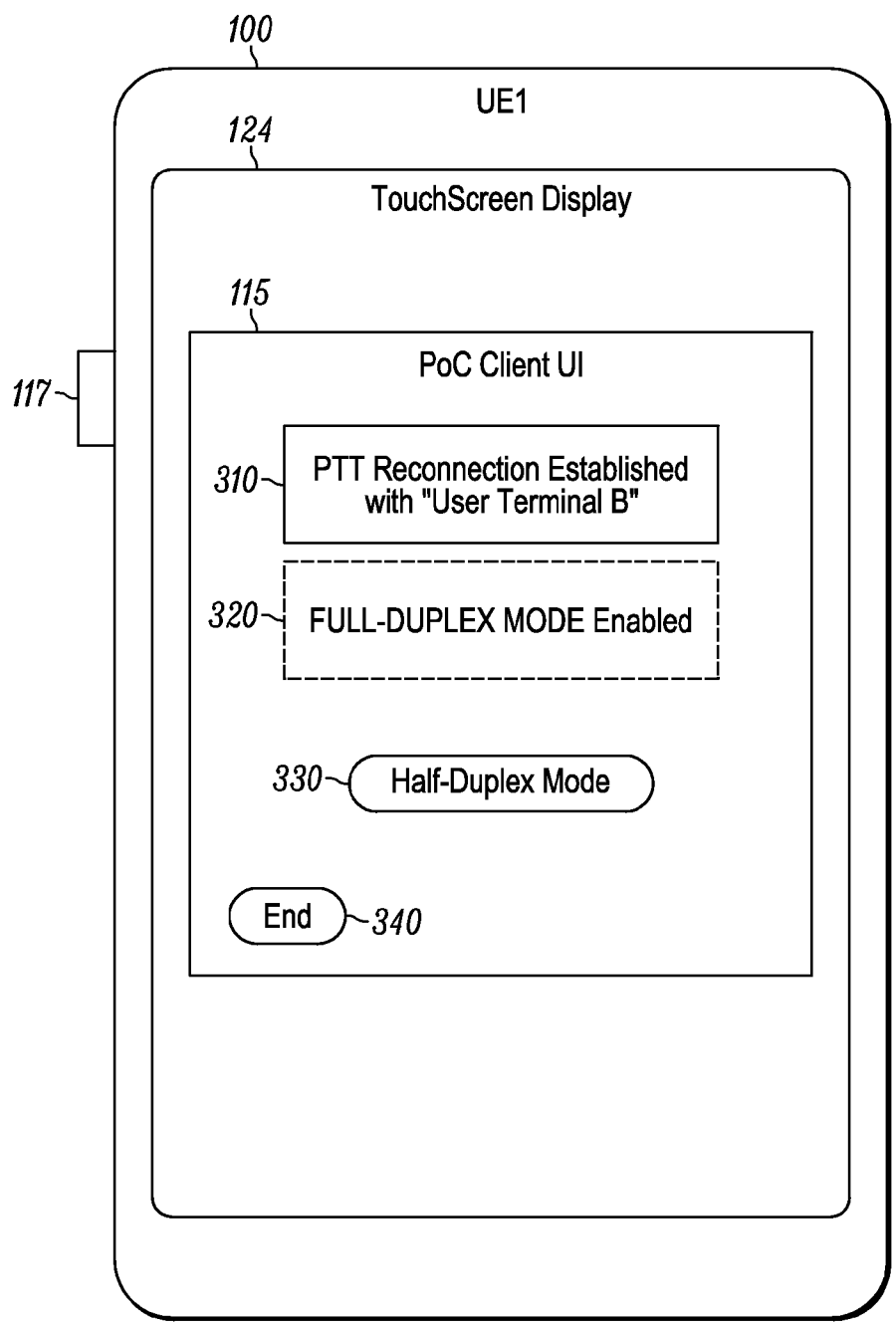
FIG. 3 illustrates an example PoC user interface of a PoC terminal or PoC UE providing notification of a call status on reconnection in full-duplex mode, according to one or more embodiments.

FIG. 3 illustrates an example user interface 115 of PoC Client 110 (FIG. 1) generated on display 124 of PoC UE1 100. The figure presents a front view 300 of UE1 100, with exterior casing (not numbered) from which protrudes a first PTT button 117. Presented on display 124 is PoC Client UI 115, which presents a first notification 310 which informs the user of UE1 100 that the reconnection of the PTT communication has been established with the endpoint device, UE2 220. PoC Client UI 115 also provides a second notification 320 which alerts the user of UE1 100 that the reconnection of the PTT communication has full-duplex mode enabled. Both first notification 310 and second notification 320 are presented as text based notifications within the illustrative embodiment. It is however appreciated that at least the second notification 320 can be audible or tactile, respectively utilizing one or more of speaker 122 or a vibration component, for example. Additionally, the second notification 320 can, in alternate embodiments, be presented as visual notification such as a blinking backlight. PoC Client UI 115 also includes a half-duplex selection affordance or soft button 330, by which a user of UE1 100 can toggle from full-duplex mode to half-duplex mode. It is appreciated that this toggling can also be performed in the opposite direction for PTT calls being conducted in half-duplex mode. PoC Client UI 115 also includes an end button 340 to terminate the PoC or PTT call. End button 340 represents one mechanism and/or methodology, among several alternatives, that provides an acceptable termination of a PTT call, i.e., a termination that is not considered to be caused by one of the pre-defined trigger conditions that requires the PoC Client 110 to create a record of the terminated communication session and associate a timer with the created record. A termination that is triggered by any one of the acceptable types of terminations for PTT calls, such as the use of the soft end button 340, will not trigger the various features described herein because such a termination would be within the acceptable types of terminations for a PTT call. Buttons are referred to as "soft" to indicate that the functionality is provided as a visual representation of a physical button on the display rather than an actual physical button.

Figure 4:
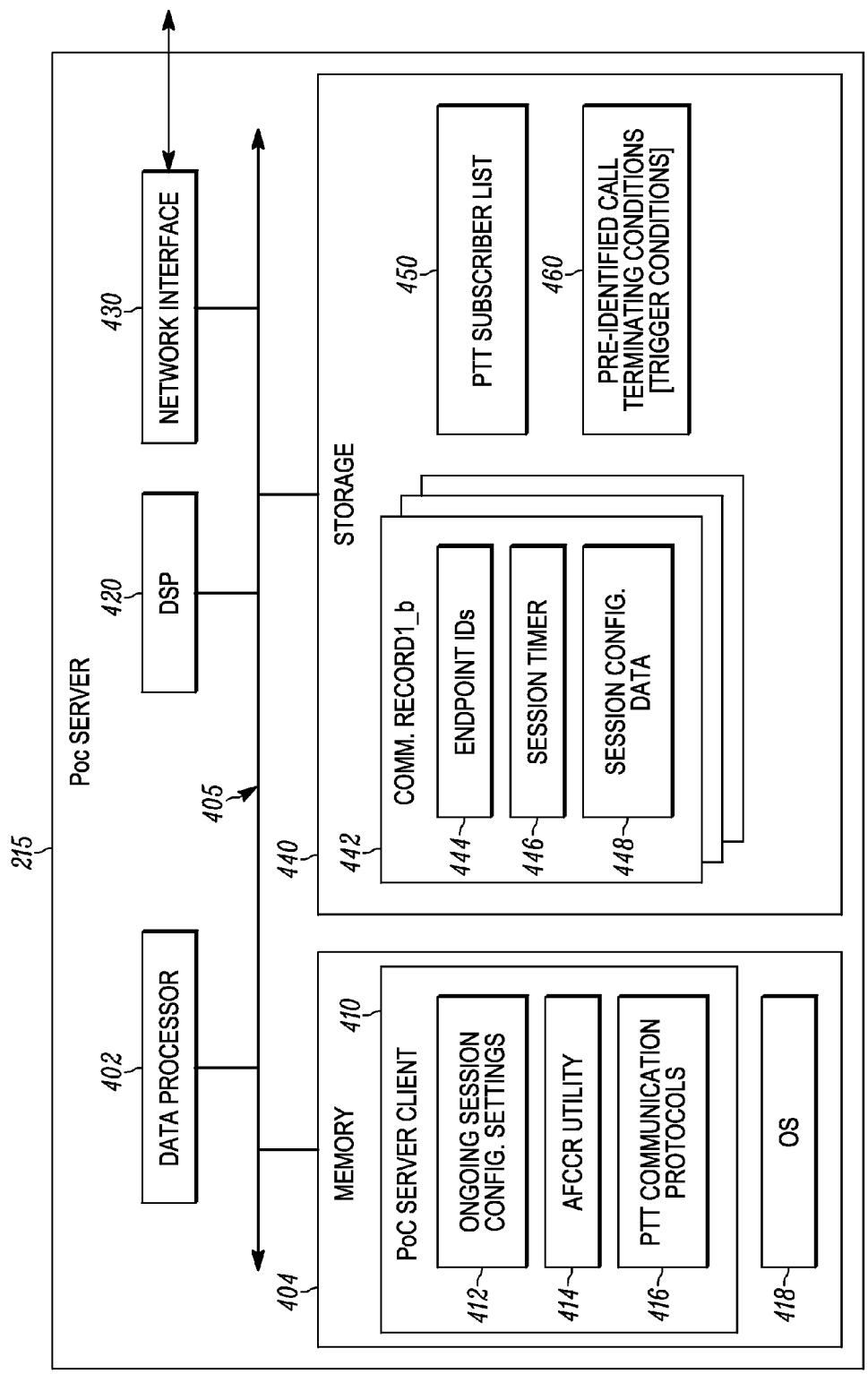
FIG. 4 is an example PoC Server within which one or more of the features of the disclosure can advantageously be implemented, in accordance with one embodiment.

According to one alternate embodiment, certain aspects of the disclosure can be provided by a PoC server rather than on a PoC client end terminal, such as UE1 100. Thus, at least one of the identifying, determining, creating, associating, and autonomously accepting processes is completed by a PTT server (PoC Server 215) supporting the communication between the first client (110) and the second client (225). As further illustrated by FIG. 4, PoC Server 215 can include data processor 402 communicatively coupled to memory 404 and storage 440 via a communication bus 405. Also coupled to communication bus 405 and to each other are DSP 420 and network interface 430. DSP 420 and network interface 430 collectively represents the various mechanisms by which PoC Server 215 can communicate with other servers, network components, and user devices via one or more connected networks. It is appreciated that these networks can be wired or wireless or a combination thereof.

As illustrated, memory 404 includes PoC Server Client 410 and Operating System (OS) 418. PoC Server Client 410 includes ongoing session configuration settings module 412, AFCCR utility 414, and PTT communication protocols 416. Generally, PoC Server Client 410 performs the server-level configuration and PTT call connections between PoC clients of an originator and one or more target UEs. Similar to the implementation of AFCCR utility 114 within UE1 100, AFCCR utility 414 provides the functionality associated with the monitoring and recording of session configuration data and the record generation and re-connection of the PTT session between the associated endpoint devices following a PTT call termination. However, the functionality of AFCCR utility 414 differs in some respects because of the need to perform the monitoring at the PoC Server 215 rather than at the UE1 100. Specifically, AFCCR utility 414 configures PoC Server Client 410 to monitor for any PTT call terminations registered at PoC Server 215 that fall within the pre-defined list of trigger conditions. Because the PoC communication session is actually managed at PoC Server 215, each type of call termination is registered by PoC Server on the network level, and call terminations falling within the pre-defined trigger conditions will be directly detectable on the network level and signaled to PoC Server Client 410. In one or more embodiments, with the UE1 implementation, AFCCR utility 114 has to first receive specific termination type data from PoC Server 215 before AFCCR utility 114 becomes aware that the termination was due to one of the pre-defined trigger conditions.

As shown, PoC Server 215 includes storage 440 within which are stored a plurality of PoC communication records 442 associated with terminated PTT calls that have terminated within a last X time interval, which can be measured in seconds. For example, storage 440 can include all communication records for all PTT calls that have terminated in the last 25 seconds. The example communication record 442 includes endpoint IDs 444, which represents the device identifiers of both the originator and the target UE corresponding to the terminated PTT session. The communication record 442 also provides a session timer 446, which can represent or provide data indicating one of (a) an amount of time that has expired since the record was created or since the PTT call was terminated; (b) an amount of time that remains from a maximum threshold amount of time pre-set for a count down timer; or (c) a specific time stamp of when the PTT call terminated. The example communication record 442 also includes session configuration data module 448, which includes information about the configuration settings for the terminated PTT call. As described herein, the relevant configuration setting presented within the described embodiments is that of a full-duplex communication mode. However, it is appreciated that other settings related to the terminated PTT call can also be stored within this data module 448. Storage 440 also contains a PTT subscriber list 450, identifying every UE that has been registered with the PoC Server 215 to be able to communicate via the PTT service. Storage 440 further includes a subset or list of pre-identified call terminating conditions 460. The subset of pre-identified call terminating conditions 460 represents trigger conditions related to types of terminating events or conditions that are pre-identified as premature terminating conditions or terminating conditions that are not among a set of acceptable call terminations.

It is appreciated that the information stored within communication record 442 can differ in some respects to the information that would be stored within communication record 142 (FIG. 1) because of the need of PoC Server 215 to include identifying information for both endpoint devices or for all endpoint devices within a group session that were participating in the terminated PTT communication. Similarly, the session timer values can be different between records based on pre-configuration of the respective PoC clients, i.e., PoC client 110 versus PoC Server Client 410. It is appreciated that several of the software components within PoC Server 215 can be similar to the core functional components within PoC UE1 100 but are configured so as to support the large network of user terminals that connect to PoC Server 215 in order to perform PTT communications with other user terminals.

Figure 5:
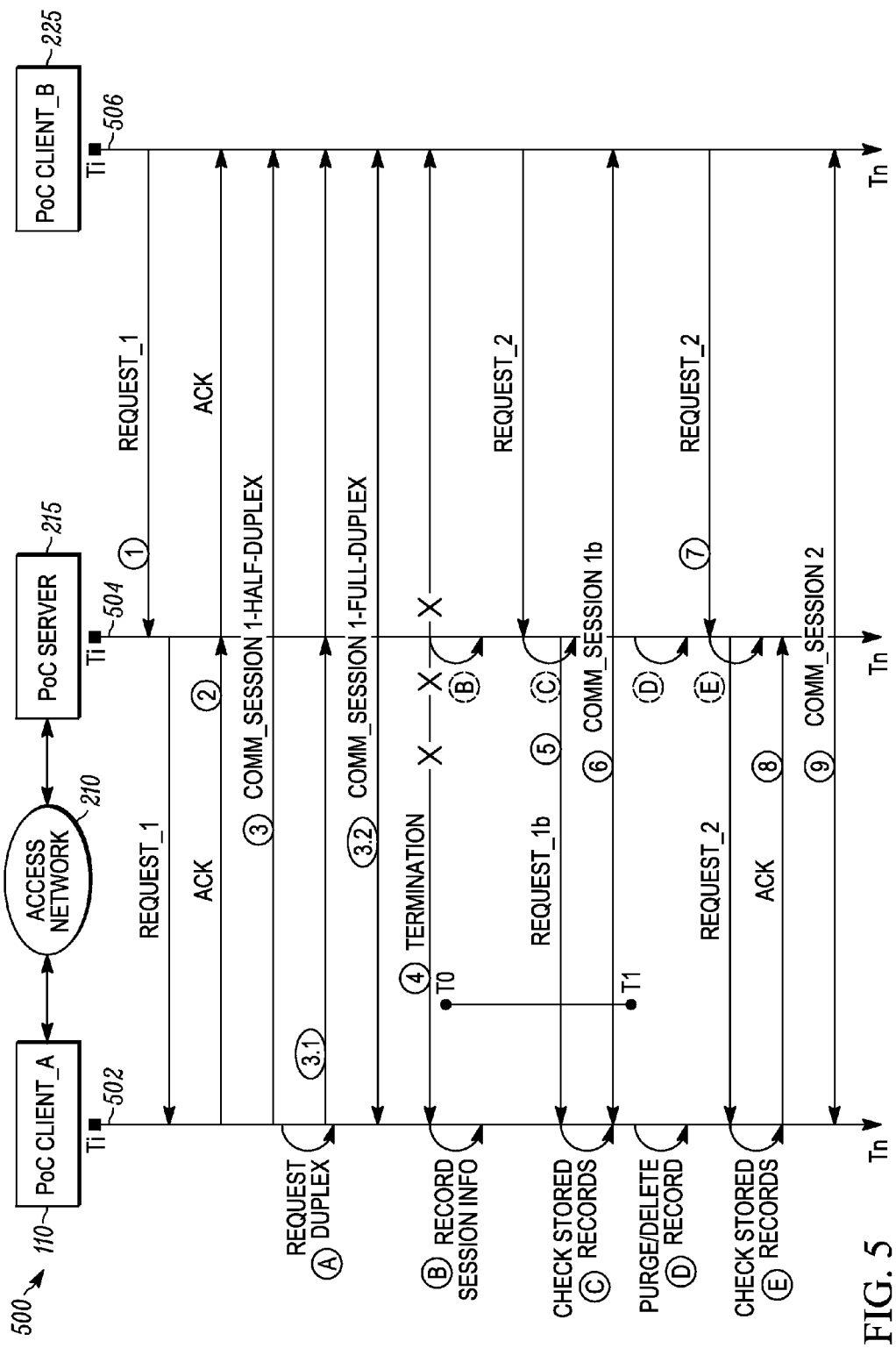
FIG. 5 illustrates an example timeline during which a first PoC call between two PoC terminals is terminated and then reconnected based on a timing of the reconnection request, according to one or more embodiments.

FIG. 5 presents an example timeline 500 with PTT communication signals indicated by straight directional arrows being transmitted between PoC Client_A 110 and PoC Client_B 225, with PoC Server 215 operating as the intermediary and/or facilitator of the PTT communication. Access network 210 is also shown as an intermediate communication network between PoC Client_A 110 and PoC Server 215 so as to harmonize the interconnection of devices with the FIG. 2 representation. The timeline 500 generally represents a sequence of discrete times during which a first PoC call or session between two PoC terminals is first initiated and configured, then terminated, and then subsequently reconnected as one of two types of communication sessions, based on a timing of the reconnection request. Each of the three participating devices is indicated having a local timeline, namely PoC Client_A timeline 502, PoC Server timeline 504, and PoC Client_B timeline 506. Each device timeline extends vertically downwards from an initial time, Ti, to a later time, Tn. The discrete times at which the communication signals are transmitted is represented by circled numbers, ranging from time 1 through time 9. Also, the main functional operations related to the disclosure and which are performed at either PoC Client_A 110 or PoC Server 215 are indicated with circled letters A through E and corresponding semicircular or curved arrows at the PoC Client_A timeline 502 and PoC Server timeline 504. The operations are shown at the PoC Server timeline 504 with dashed lins to indicate that this is an optional or alternate implementation. However, it is appreciated that most of the operations can be performed by PoC Server 215, as presented above with the description of FIG. 4, as a primary implementation, in one or more embodiments.

Within example timeline 500, PoC Client_B 225 operates as the originator and PoC Client_A 110 is the target for PTT communications. The time sequence begins with a first exchange at time 1 in which PoC Client_B 225 issues a first request to initiate a PTT communication session with PoC Client_A 110. The first request is received by PoC Server 215, which handles the initial connection between UEs and also supports the resulting PTT sessions. PoC Server 215 performs the required protocol lookup and device authentications and forwards the request to PoC Client_A 110. The request is received at PoC Client_A 110, which generates an acknowledgement (ACK) that is transmitted at time 2 back to PoC Client_B 225. With the ACK response received, PoC Client_B 225 begins communicating with PoC Client_A 110 via a first communication session established between the two clients 110 and 225, with the PoC Server 215 operating as the intermediary server supporting the session. The initial communication session is configured as a half-duplex communication.

At time 3.1, PoC Client_A 110 performs operation A and transmits a request for the communication session to be configured as a full-duplex communication. PoC Client_B 225 accepts the request and the communication session is established as a full-duplex mode at time 3.2. Notably, while indicated as occurring within some time period after initial establishment of the communication session, the timing of the configuration of the communication session to a full-duplex communication can occur at any time after establishment of the communication session.

At some time following the establishment of the communication session as a full duplex communication, indicated as time 4, a terminating event occurs, which causes the communication session to be prematurely terminated, indicated by the broken communication lines, with dashes and X representing the break in communication. According to one embodiment, the PoC Server 205 receives network level data that identifies the reason for each call termination. As introduced above, PoC Server 205 maintains a subset or list of call terminating conditions 460 that represents trigger conditions related to types of termination events or conditions that are pre-identified as premature termination conditions or terminating conditions that are not among a set of acceptable terminations. When a terminating condition from within the subset of call terminating conditions 460 is received or detected, PoC Client_A 110 is notified of the occurrence of the trigger condition. The occurrence of the terminating event triggers initiation of a temporary timer, indicated as a time bar, which extends for a time period illustrated as extending from times T0 to T1. As indicated, PoC Client_A 110 performs operation B, which involves and recording session information of the terminated session. Notably, this recording of session information can also be performed at or by PoC Server 215 and this alternate implementation is also indicated by the presence of a similar operation B at the PoC Server timeline 504.

The running of the time period indicated by the time bar (T0-T1) dictates the different responses provided to any subsequently received request for establishing PTT communication sessions. At time 5, a second request is received targeting PoC Client_A 110. Notbaly, time 5 at which the second request is received and processed by both PoC Server 215 and PoC Client_A 110 falls within the time period being tracked by the time bar, i.e., occurs before expiration of the time period (T0-T1). As shown by operation C, PoC Client_A 110 checks the stored records. In response to the stored records containing a record for the previously terminated PTT communication session involving the current set of endpoints, PoC Client_A 110 and/or PoC Server 215 retrieves the required data from the stored records and utilizes the stored records to establish another communication session 1*b* at time 6. As indicated, the new communication session 1*b* is treated as a reconnection of the previous communication session 1 that ended prematurely based on one of the set of specific conditions.

Operation D is performed at time T1, or just after time T1, and involves purging or deleting the previously stored record. At time 7, a second communication request is transmitted from PoC Client_B 225 to PoC Client_A 110 via PoC Server 215. As shown, this request is received at PoC Client_A 110 after the expiration of the time period T1. PoC Client_A 110 again checks for a stored record (as operation E) in response to receipt of the second request at time 7. Because the second request originated at a time following expiration of the time period tracked by the time bar, no stored records exist for the previously terminated session. Thus, both PoC Server 215 and PoC Client_A 110 treat the second request as a new request for a PTT communication session, and PoC Client_A 110 generates an ACK response to the second request at time 8. This request and ACK combination triggers PoC Server 215 to enable a second communication session, as shown at time 9.

It is appreciated that while the second request is shown as originating from PoC Client_B 225, the second request can originate from a different PoC Client other than one involved in the first communication session. In such a case, no record would exist for the second communication request and the request would be treated as a new request, similarly to any request received outside of (i.e., following expiration of) the time period. Also, the request for the second communication session can originate from UE1 110 when PoC Client_B 225 of UE2 220 is similarly configured as PoC Client_A 110 to handled such premature termination of established PTT communication sessions.

Figure 6:
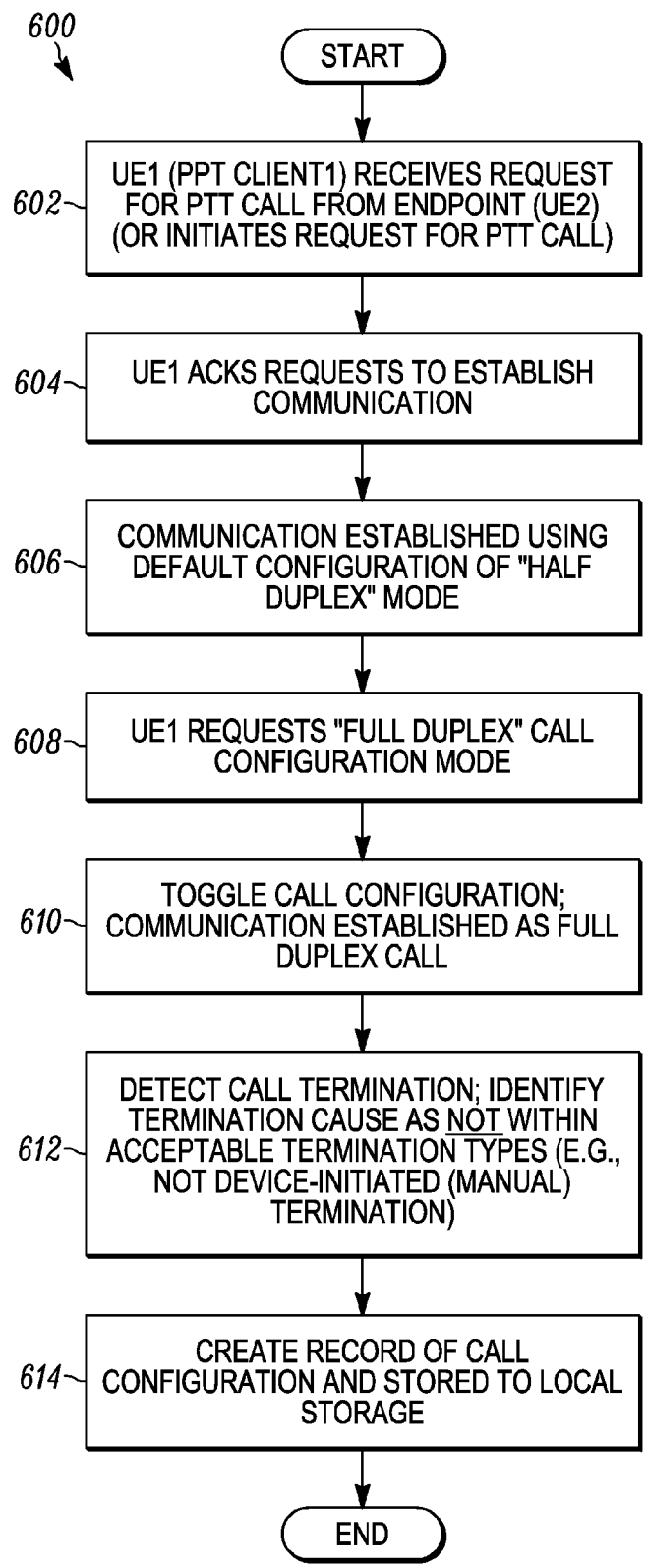
FIG. 6 is a flow chart illustrating a method of initiating an initial PoC session that is configured for full-duplex mode and responding to call termination conditions, according to one embodiment.
Figure 7:
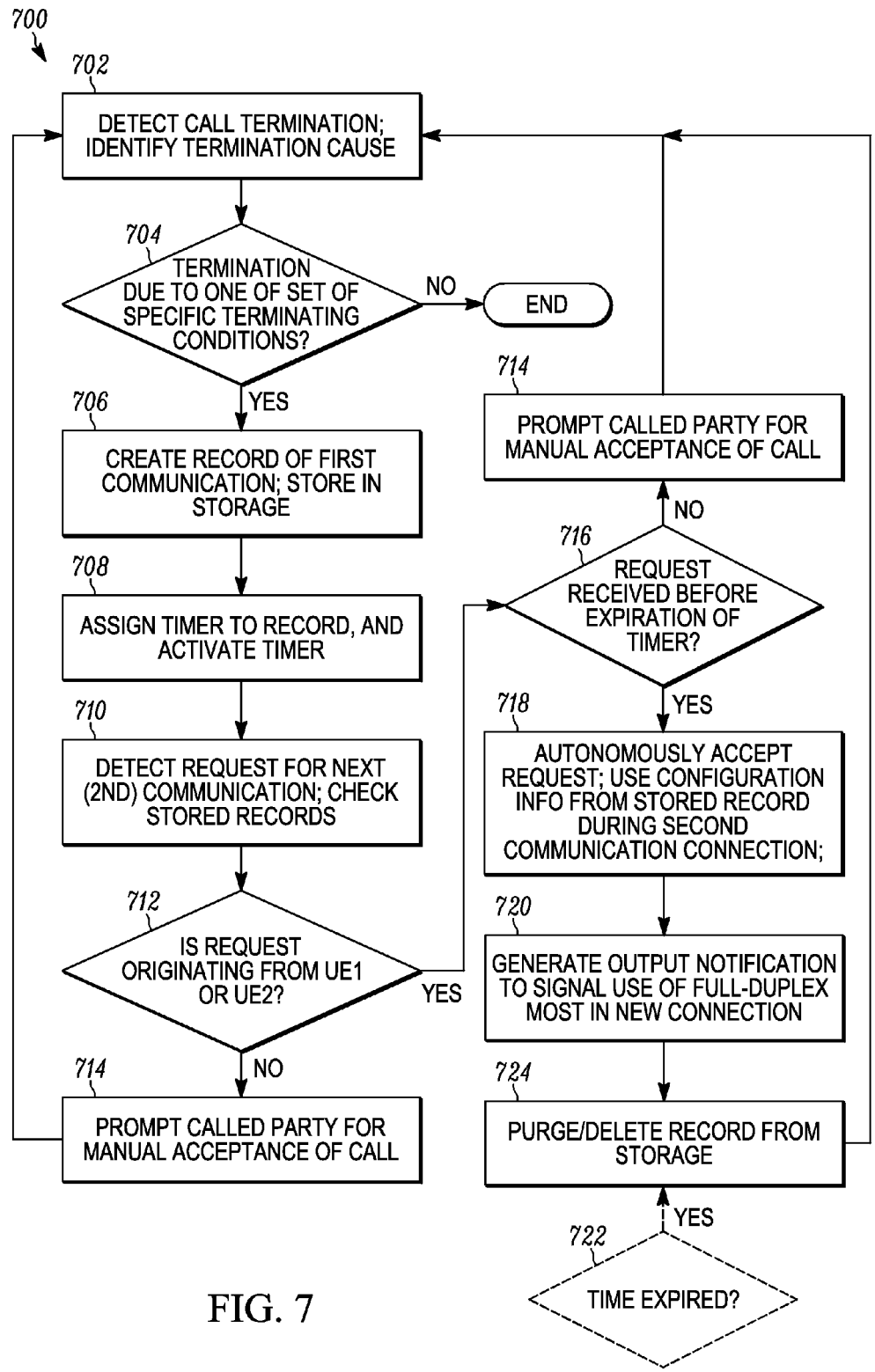
FIG. 7 is a flow chart illustrating a method by which a terminated PoC call that was being conducted in full-duplex mode can be autonomously reconnected in full-duplex mode, according to one or more embodiments.

Turning now to the flow charts, FIG. 6 illustrates a method 600 of initiating an initial PoC session that is configured for full-duplex mode and responding to call termination conditions, according to one embodiment. FIG. 7 further illustrates a method 700 by which a terminated PoC call that was being conducted in full-duplex mode can be autonomously reconnected in full-duplex mode, according to one or more embodiments. Aspects of the method 600 and to some extent method 700 are described from the perspective of the PoC UE1 100. It is appreciated that within the method, reference to UE1 100 as the general communication device is intended to convey operations performed at/on PoC UE1 100 by PoC Client 110 and AFCCR 114 executing on processors 106, 108 of UE1 100. It is further appreciated that certain aspects of the method 700 can be performed at PoC Server 215 as presented above. Within this alternate embodiment, the references to UE1 100 within method 700 can, in some instances, be replaced by PoC Server 215, as appropriate.

Both method 600 and method 700 are described with reference to the preceding figures, as appropriate. Method 600 begins at start block and proceeds to block 602 at which UE1 100 receives a request for a PTT call from endpoint device, UE2 220. In this implementation, UE2 220 operates as the originator and UE1 100 operates as the target for the first PTT session request (see FIG. 5). It is however appreciated that the roles of originator and target can be reversed, whereby UE1 initiates the request for the PTT call, as also shown in block 602. At block 604, UE1 100 acknowledges the request to establish the PTT session. The acknowledgement is transmitted to UE2 200 and establishes a first communication session between the two devices. During or following the establishment of the first communication session, PoC Client 110 automatically configures UE1 100 to perform the first communication session using a default first call configuration of at least two available call configurations (block 606). As described above, the first call configuration is a half-duplex mode, which is the default communication mode, and the second call configuration is a full-duplex mode, which has to be manually activated on the UE1 100 and UE2 220 during an initial communication session between the two devices. UE1 100 includes functionality to enable toggling of a configuration of the first communication session between the first call configuration and the second call configuration. At block 608, method 600 includes UE1 100 requesting the communication be switched to a full-duplex mode. In response to receiving the input to change the call configuration from the default call configuration, method 600 includes UE1 100 toggling the call configuration to the full duplex mode and supporting the first communication session in full duplex mode (block 610). Then at block 612, method 600 includes detecting a termination of the first communication session that is not within the acceptable types of terminating conditions. For example, an acceptable type of terminating condition would include a termination that is triggered by user input at one of UE1 100 or UE2 220. In response to that detection, method 600 includes UE1 100 recording to storage configuration data associated with the terminated communication session (block 614). Method 600 then ends at the end block.

Turning to FIG. 7, method 700 resumes at the point at which method 600 ends. At block 702, method 700 includes detecting a call termination event and in response to detecting the termination of the first communication session, identifying from among a set of call terminating conditions a specific call terminating condition by which the first communication session terminates. Method 700 then proceeds to decision block 704 which includes determining if the specific call terminating condition is a call terminating condition within a first subset of call terminating conditions. As presented herein, the specific subset of call terminating conditions of interest include, but are not necessarily limited to, a voice inactivity timeout, a call duration timeout, a call drop condition, and a network timeout condition. If the call terminating condition is not within the subset, the method 700 ends at end block. However, in response to the specific call terminating condition being within the first subset of call terminating conditions, method 700 includes UE1 100 creating a record of the first communication session, including information indicating a call configuration that was active at the time of the call termination, and storing the record to a storage (block 706). In one embodiment, creating the record includes recording information within the record such as, but not necessarily limited to, an identification of the endpoint, the call configuration, and one of (a) an expiration time of the timer and (b) an initial time at which the call termination occurred, and a length of time for maintaining the record. Method 700 then includes associating or assigning a timer with the record and activating the timer (block 708). At block 710, method 700 provides detecting a request for a second communication session and checking the stored records for the presence of a record that includes the same pairing of originator and target devices, UE1 100 and UE2 220. Method 700 then provides determining at decision block 712 whether the request originated from one of the two paired devices and targets the other one of the two paired devices. If the request is not from one of the two paired devices, method 700 includes providing a notification on the device of the called party to provide a manual acceptance of the request for the second communication session (block 714).

However, in response to the request originating from one of the two paired devices identified within the retrieved record, method further includes determining at decision block 716 whether the request was received before expiration of the timer associated with the retrieved record. If, as determined at block 716, the request was not received before expiration of the timer for the retrieved record, the method 700 proceeds again to block 714 at which the request is treated as an initial request and the called party or device is notified and allowed to manually accept the request to initiate a new PTT session. The process then returns to block 702.

Returning to block 716, in response to the request for the second communication session being received prior to the expiration of the timer for the stored record, method 700 includes autonomously accepting the request to establish a second communication session as a reconnection of the first communication session using the call configuration indicated by the information within the retrieved record (block 718). As noted above, this autonomous acceptance and configuration of the communication session occurs in response to the second request (a) being received before expiration of the timer and (b) establishing the second communication session between the original pair of devices involved in the communication session. Following, in accordance with one embodiment, method 700 provides that in response to the call configuration that is autonomously established being the second call configuration, autonomous acceptance of the request to establish the second communication session further includes generating a notification or output at the communication devices (e.g., both UE1 100 and UE2 220) indicating that the second communication session is being performed via the second call configuration (block 720). Method 700 further includes purging the associated record from storage (block 724).

In an alternate embodiment, the tracking of the timers associated with the stored records is performed periodically in the background, and in response to a timer expiring, the particular record is purged and/or deleted from storage. This sequence is illustrated by the inset of dashed block 722 also leading to block 724. With this alternate implementation, there is never a need to perform the check at block 716 because the record for the previous session would have already been purged from the storage system and not retrieved at block 710. Thus, in response to not finding a stored record associated with the a previous communication, the method includes: requesting acceptance at the communication device of the second communication session; and in response to receiving the acceptance, establishing the second communication session as a new communication session utilizing a default call configuration for new communication sessions.

In the flow chart above, certain functions of the methods can be combined, performed simultaneously or in a different order, or perhaps omitted, without deviating from the spirit and scope of the described innovation. While the method functions are described and illustrated in a particular sequence, use of a specific sequence of functions is not meant to imply any limitations on the innovation. Changes may be made with regards to the sequence of functions without departing from the spirit or scope of the present disclosure. Use of a particular sequence is therefore, not to be taken in a limiting sense, and the scope of the present disclosure is defined only by the appended claims.

As will be appreciated by one skilled in the art, embodiments of the present disclosure may be embodied as a system, device, and/or method. Accordingly, embodiments of the present disclosure may take the form of an entirely hardware embodiment or an embodiment combining software and hardware embodiments that may all generally be referred to herein as a "circuit," "module" or "system."

Aspects of the present disclosure are described with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the disclosed innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the innovation in the form disclosed. Many modifications and variations will be apparent to those of ordinary skill in the art without departing from the scope and spirit of the disclosure. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A method for handling calls involving a communication device, the method comprising:

establishing a first communication session between the communication device and an endpoint;

configuring the communication device to perform the first communication session via a first call configuration of at least two available call configurations;

enabling toggling of a configuration of the first communication session between the first call configuration and a second call configuration;

in response to detecting a termination of the first communication session, identifying from among a set of call terminating conditions a specific call terminating condition by which the first communication session terminates;

determining if the specific call terminating condition is a call terminating condition within a first subset of the call terminating conditions;

in response to the specific call terminating condition being within the first subset of the call terminating conditions:

creating a record of the first communication session, including information indicating a call configuration that was active at a time of the call termination;

associating a timer with the record and activating the timer; and autonomously accepting a request to establish a second communication session as a reconnection of the first communication session using the call configuration indicated by the information within the record, in response to the request (a) being received before expiration of the timer and (b) establishing the second communication session between the communication device and the endpoint.

2. The method of claim 1, wherein:
creating the record of the first communication session comprises recording information within the record comprising an identification of the endpoint, the call configuration, and one of (a) an expiration time of the timer and (b) an initial time at which the call termination occurred and a length of time for maintaining the record; and;
the method further comprises:
storing the record within a storage;
monitoring the timer; and
in response to the timer expiring, purging the record from the storage.

3. The method of claim 2, further comprising:
in response to receiving the request to establish the second communication session:
checking the storage for a stored record associated with a previous communication involving both the communication device and the endpoint; and
in response to not finding a stored record associated with the a previous communication: requesting acceptance at the communication device of the second communication session; and in response to receiving the acceptance, establishing the second communication session as a new communication session utilizing a default call configuration for new communication sessions.

4. The method of claim 1, wherein:
the first communication session and the second communication session are push to talk (PTT) communications;
the first call configuration is a half-duplex mode and the second call configuration is a full-duplex mode; and
the communication device and the endpoint comprise PTT clients that handle the first communication session via one of PTT protocols and PTT over cellular (PoC) protocols,
configured to enable a communication terminated due to one of the first subset of call terminating conditions to be re-established autonomously on request from one of the communication device and the endpoint within a pre-set time limit.

5. The method of claim 4, wherein the half-duplex mode is a default call configuration and the method further comprises:
in response to receiving an input to change the call configuration from the default call configuration, toggling the call configuration to the full duplex mode and supporting the first communication session in full duplex mode.

6. The method of claim 1, wherein the subset of call terminating conditions comprises at least one of a voice inactivity timeout, a call duration timeout, a call drop condition, and a network timeout condition.

7. The method of claim 1, wherein the communication device is a user equipment (UE) that enables wireless communication and the first communication session involves a wireless communication.

8. The method of claim 1, wherein the communication device is a user equipment (UE) that enables wired communication and the first communication session is facilitated via a physical communication link between the communication device and the endpoint.

9. The method of claim 1, wherein:
in response to the call configuration being the second call configuration, autonomous acceptance of the request to establish the second communication session further comprises generating an output at the communication device indicating that the second communication session is being performed via the second call configuration.

10. The method of claim 1, wherein the first communication session and the second communication session are push to talk calls and at least one of the identifying, determining, creating, associating, and autonomously accepting processes is completed by a PTT server supporting the communication between the communication device and the endpoint.

11. A device comprising:
at least one processor;
a storage device coupled to the at least one processor and having program code that executes on the at least one processor and causes the device to:
establish a first communication session between a first client and a second client;
configure the first communication session to be performed via a first call configuration of at least two available call configurations;
enable toggling of a configuration of the first communication session between the first call configuration and a second call configuration;
in response to detecting a termination of the first communication session, identify from among a set of call terminating conditions a specific call terminating condition by which the first communication session terminates;
determine if the specific call terminating condition is a call terminating condition within a first subset of the call terminating conditions;
in response to the specific call terminating condition being within the first subset of the call terminating conditions:
create a record of the first communication session, including information indicating a call configuration that was active at a time of the call termination;
associate a timer with the record and activating the timer; and
trigger at least the first client to autonomously accept a request to establish a second communication session as a reconnection of the first communication session using the call configuration indicated by the information within the record, in response to the request (a) being received before expiration of the timer and (b) establishing the second communication session between the first client and the second client.

12. The device of claim 11, wherein:
the program code that causes the device to create the record of the first communication session comprises program code that causes the device to record first communication session information within the record, the information comprising an identification of at least the second client, the call configuration, and one of (a) an expiration time of the timer and (b) an initial time at which the call termination occurred and a length of time for maintaining the record; and
the program code further comprises code that causes the device to:
store the record within a storage;
monitor the timer; and
in response to the timer expiring, purge the record from the storage.

13. The device of claim 12, further comprising program code that causes the device to:
in response to receiving the request to establish the second communication session:
check the storage for a stored record associated with a previous communication involving both an originating client from which the request originated and an endpoint client to which the request is directed; and
in response to not finding a stored record associated with a previous communication: request acceptance of the second communication session at the endpoint client; and in response to receiving the acceptance, establish the second communication session as a new communication session utilizing a default call configuration for new communication sessions.

14. The device of claim 11, wherein:
the first communication session and the second communication session are push to talk (PTT) communications;
the first call configuration is a half-duplex mode and the second call configuration is a full-duplex mode; and
the first client and the second client compose PTT clients that handle the first communication session via one of PTT protocols and PTT over cellular (PoC) protocols, configured to enable a communication terminated due to one of the first subset of call terminating conditions to be re-established autonomously on request from one of the first client and the second client within a pre-set time limit.

15. The device of claim 14, wherein the half-duplex mode is a default call configuration and the program code further comprises program code that causes the device to:
in response to receiving an input to change the call configuration from the default call configuration, toggle the call configuration to the full duplex mode and support the first communication session in full duplex mode.

16. The device of claim 11, wherein the subset of call terminating conditions comprises at least one of a voice inactivity timeout, a call duration timeout, a call drop condition, and a network timeout condition.

17. The device of claim 11, wherein the first client exists on user equipment (UE) that enables wireless communication and the first communication session involves a wireless communication.

18. The device of claim 11, further comprising:
at least one output mechanism that enables output of call-related output parameters, and wherein the program code that causes the device to autonomously accept the request to establish the second communication session, further comprises code that causes the device to generate an output at the communication device indicating that the second communication session is being performed via the second call configuration, in response to the call configuration within the record being the second call configuration.

19. The device of claim 18, wherein the first clients exists on user equipment (UE) that enables wired communication and the first communication session is facilitated via a physical communication link between the communication device and the endpoint.

20. The device of claim 11, wherein the first communication session and the second communication session are push to talk calls and at least one of the identifying, determining, creating, associating, and autonomously accepting processes is completed by a PTT server supporting the communication between the first client and the second client.

* * * * *

UNITED STATES PATENT AND TRADEMARK OFFICE
CERTIFICATE OF CORRECTION

PATENT NO. : 9,049,688 B2  
APPLICATION NO. : 13/758297  
DATED : June 2, 2015  
INVENTOR(S) : Mitchell E. Renko Page 1 of 1

It is certified that error appears in the above-identified patent and that said Letters Patent is hereby corrected as shown below:

In the Claims:

Claim 2, Column 17, Line 7, please change "record; and;" to "record; and"; and

Claim 3, Column 17, Lines 19-20, please change "with the a previous" to "with the previous."

Signed and Sealed this
Thirteenth Day of October, 2015

Michelle K. Lee
*Director of the United States Patent and Trademark Office*